US012784275B2

(12) United States Patent
Adam et al.

(10) Patent No.: US 12,784,275 B2
(45) Date of Patent: Nov. 3, 2026

(54) METHOD FOR CALIBRATING A CAMERA AND ASSOCIATED DEVICE

(71) Applicant: RENAULT S.A.S, Boulogne-Billancourt (FR)

(72) Inventors: Jean-Luc Adam, Toulouse (FR); Soukaina Mabrouk, le chesnay (FR)

(73) Assignee: RENAULT S.A.S, Boulogne-Billancourt (FR)

( * ) Notice: Subject to any disclaimer, the term of this patent is extended or adjusted under 35 U.S.C. 154(b) by 887 days.

(21) Appl. No.: 18/001,568

(22) PCT Filed: May 31, 2021

(86) PCT No.: PCT/EP2021/064559
§ 371 (c)(1),
(2) Date: May 25, 2023

(87) PCT Pub. No.: WO2021/249809
PCT Pub. Date: Dec. 16, 2021

(65) Prior Publication Data

US 2023/0306638 A1 Sep. 28, 2023

(30) Foreign Application Priority Data

Jun. 12, 2020 (FR) ....................................... 2006169

(51) Int. Cl.
*G06T 7/80* (2017.01)
*G06T 7/70* (2017.01)
*G06V 10/74* (2022.01)

(52) U.S. Cl.
CPC .................. *G06T 7/80* (2017.01); *G06T 7/70* (2017.01); *G06V 10/761* (2022.01); *G06T 2207/20084* (2013.01); *G06T 2207/30252* (2013.01)

(58) Field of Classification Search
CPC ... G06T 7/80; G06T 7/70; G06T 2207/20084; G06T 2207/30252; G06T 2207/10028; G06T 7/97; G06V 10/761
See application file for complete search history.

(56) References Cited

U.S. PATENT DOCUMENTS 9,201,424 B1 * 12/2015 Ogale .................. G05D 1/0253
10,163,226 B2 * 12/2018 Ermilios ................... G06T 7/80
(Continued)

OTHER PUBLICATIONS

International Search Report issued Aug. 12, 2021, in PCT/EP2021/064559, 3 pages.
(Continued)

*Primary Examiner* — Molly Wilburn
(74) *Attorney, Agent, or Firm* — Oblon, McClelland, Maier & Neustadt, L.L.P.

(57) ABSTRACT

A method for calibrating a camera on board a motor vehicle using a reference sensor on board the vehicle includes: a) acquiring, using the reference sensor, actual positions of at least one object in the vehicle surroundings, b) taking, using the camera, a shot each time one of the actual positions is acquired by the reference sensor, c) determining the position of the image of each object in the shots taken by the camera, d) forming position pairs by matching each actual position of each object with the position of the image of the object in the shot taken by the camera at the time of acquiring the actual position of the object, e) determining, using a computing unit, parameters for calibrating the camera from the position pairs formed.

12 Claims, 4 Drawing Sheets

(56) References Cited

U.S. PATENT DOCUMENTS

| | | | | |
|---|---|---|---|---|
| 10,339,390 | B2 * | 7/2019 | Shen | G01B 11/002 |
| 2009/0290032 | A1 | 11/2009 | Zhang et al. | |
| 2015/0379766 | A1 * | 12/2015 | Newman | H04N 13/296<br>356/5.01 |
| 2018/0181142 | A1 * | 6/2018 | Baran | B60D 1/36 |
| 2018/0357503 | A1 * | 12/2018 | Wang | G06T 7/80 |
| 2019/0019335 | A1 * | 1/2019 | Elangovan | G06T 19/006 |
| 2019/0122386 | A1 | 4/2019 | Wheeler et al. | |
| 2019/0259180 | A1 * | 8/2019 | Tanaka | G01B 11/26 |
| 2020/0018852 | A1 | 1/2020 | Walls et al. | |
| 2021/0075959 | A1 * | 3/2021 | Dabral | G06T 7/174 |

OTHER PUBLICATIONS

Preliminary Search Report issued Feb. 23, 2021, in FR2006169 (with English Translation of Category of Cited Documents), 4 pages.

Ganesh Iyer et al. “CalibNet: Geometrically Supervised Extrinsic Calibration using 3D Spatial Transformer Networks” arxiv.org, Cornell University Library, 201 Olin Library Cornell University Ithaca, NY 14853, Mar. 22, 2018, DOI: 10.1109/IROS.2018.8593693, XP081 454691, 8 pages.

Shashank Deshpande et al., “Computer Vision and Imaging in Intelligent Transportation Systems”, Mar. 14, 2017, pp. 259-282, John Wiley & Sons Ltd., DOI: 10.1002/9781118971666. XP055778534, p. 266-p. 273 Retrieved from the Internet: https://onlinelibrary.wiley.com/doi/book/10.1002/9781118971666,.

Office Action dated Jul. 10, 2026 issued in corresponding Korean patent application No. 10-2023-7001261 (with English translation).

* cited by examiner

METHOD FOR CALIBRATING A CAMERA AND ASSOCIATED DEVICE

TECHNICAL FIELD OF THE INVENTION

The present invention relates in a general way to the calibration of a camera on board a vehicle.

More particularly, it relates to a method for calibrating a camera on board a motor vehicle.

The invention may be applied particularly advantageously to the calibration of what are known as "context cameras", used for displaying the environment and thus validating the behavior of vehicles provided with driver assistance systems, for example emergency braking assistance systems.

The invention also relates to a device for calibrating a camera on board a motor vehicle.

PRIOR ART

A camera on board a vehicle has to be calibrated, in order, on the one hand, to enable a representation of an object detected in the environment of the vehicle by the camera to be positioned in a shot (or photograph) acquired by the camera, and, on the other hand, to enable the actual position of an object in the environment of this vehicle to be known on the basis of the shot acquired by the camera.

In practice, calibrating a camera is therefore a matter of being able to switch from a reference frame associated with the vehicle to a reference frame associated with a shot acquired by the camera More precisely, the calibration of a camera is based on the determination of two types of calibration parameters: on the one hand, extrinsic calibration parameters for modelling the switch from a point in the reference frame associated with the vehicle to a point in a reference frame associated with the camera, and, on the other hand, intrinsic parameters that depend on the nature of the camera, for modelling the switch from the point in the reference frame associated with the camera to an image of this point, also called a pixel, in the reference frame associated with the shot acquired by the camera.

The existing procedures for determining these calibration parameters, particularly the extrinsic parameters, are based on measurements of small angles and measurements of shifts between the origins of the different reference frames. However, it is difficult to establish the origin of the reference frame associated with the camera, because this frame is dependent on the orientation of the optical sensor of the camera. Furthermore, such measurements require precision instrumentation. These existing procedures are therefore complicated and time-consuming, and require the immobilization of the vehicle on a test bench.

DESCRIPTION OF THE INVENTION

In order to overcome the aforesaid drawbacks of the prior art, the present invention proposes a simplified calibration method that can be used without requiring the immobilization of the vehicle on a test bench.

More particularly, the invention proposes a method for calibrating a camera on board a motor vehicle using a reference sensor on board the vehicle, according to which provision is made for determining camera calibration parameters by means of the following steps:

- a) acquiring, by the reference sensor, a plurality of actual positions of at least one object in the environment of the vehicle,
- b) acquiring, using the camera, a shot at each instant when one of the actual positions is acquired by the reference sensor,
- c) determining the position of the image of each object in the shots acquired by the camera,
- d) forming position pairs by matching each actual position of each object with the position of the image of said object in the shot acquired by the camera at the instant of acquiring said actual position of this object,
- e) determining, using a computing unit, calibration parameters of the camera, from the set of position pairs formed.

Thus, because of the invention, the actual positions of objects are precisely determined by the reference sensor, which is already calibrated. The actual positions may be captured when the vehicle is running. The camera may therefore be calibrated without any need to put the vehicle on a test bench. This provides an appreciable degree of flexibility, notably in view of the fact that it the camera may have to be calibrated on a number of occasions in the course of time, for example after an impact that causes a change in the camera position.

The method is quick and simple to use.

Furthermore, this calibration method is applicable to any type of camera, including wide-angle cameras (also known as "fish eye" cameras).

The method is also applicable regardless of the reference sensor on board the vehicle, which may be a camera or another sensor such as a detection system using electromagnetic waves of the radio or light type (radar or lidar).

With this method, it is no longer necessary to make measurements of small angles and measurements of shifts between the origins of the different reference frames.

Other advantageous and non-limiting characteristics of the method according to the invention, considered individually or any technically possible combination, are as follows:

- in step e), said calibration parameters of the camera are extrinsic parameters formed by the coefficients of a rotation and/or translation matrix describing the switch from a reference frame associated with the vehicle to a reference frame associated with the camera;
- in step e), the determination of said extrinsic calibration parameters comprises the following substeps:
- e1) for each position pair formed, a theoretical position of the image of the object is calculated, based on the actual position of said object determined in step a) and the coefficients of the matrix, and then the difference between the theoretical position thus calculated, on the one hand, and the position determined in step c) of the image of said object in the shot, on the other hand, is evaluated;
- e2) the mean of all the differences evaluated in step e1) is calculated;
- e3) the coefficients of the matrix are modified; and
- e4) substeps e1) to e3) are iterated until the mean of the differences calculated in substep e2) is minimized;
- before substep e1), the coefficients of the rotation and/or translation matrix are all initialized to a predetermined level, preferably equal to 1;
- the acquisition steps a) and b) are executed while the vehicle is running along a straight line, on a substantially horizontal and flat roadway;
- in step a), the reference sensor acquires at least 5 different actual positions of objects, dispersed in the whole of the field of view of said reference sensor covering the field of view of the camera;

step c) of determining the position of the image of each object in each shot acquired by the camera is executed manually by an operator;

step c) of determining the position of the image of each object in each shot acquired by the camera is executed by an image processing unit comprising a neural network.

The invention also proposes a device for calibrating a camera on board a motor vehicle, adapted to communicate with said camera and with a reference sensor on board the vehicle, said reference sensor being provided to acquire a plurality of actual positions of at least one object in the environment of the vehicle, said device comprising:

a memory unit in which are recorded the actual position of each object in the reference frame associated with the vehicle at a given instant and a shot acquired by the camera at this given instant, an image processing unit adapted to determine the position of the image of each object in the shots acquired by the camera and to form position pairs by matching said position of the image of the object in the shot with the actual position of said object at the instant of acquisition of the shot, and a computing unit adapted to calculate calibration parameters of the camera, on the basis of the set of position pairs formed by the image processing unit.

Because of the device according to the invention, the calibration can be executed while the vehicle is running, without any need to immobilize the vehicle on a test bench. The device also makes ingenious use of the reference sensor already present in the vehicle.

According to an advantageous characteristic of the device according to the invention, the reference sensor is chosen from the following list of sensors: a camera, a stereoscopic camera, and a detection system using electromagnetic waves.

According to another advantageous characteristic of the device according to the invention, the camera is a camera for validating driver assistance systems.

The advantageous characteristics listed for the method according to the invention are also applicable to the device according to the invention.

Evidently, the different features, variants and embodiments of the invention may be associated with one another in various combinations, as long as they are not mutually incompatible or mutually exclusive.

DETAILED DESCRIPTION OF THE INVENTION

The following description, referring to the attached drawings which are provided by way of non-limiting example, will make the nature and application of the invention clear.

In the Attached Drawings:

FIG. 2 shows a calibration device 1 according to the invention, adapted to implement a calibration method according to the invention, the main steps of which are shown in FIG. 1.

This device 1 and this calibration method each have the purpose of calibrating a camera 10 on board a motor vehicle (not shown).

The camera 10 is capable of taking shots of the area outside the vehicle. Here, the camera 10 takes shots at time intervals that are sufficiently close for a human eye to perceive the shots as following each other continuously, without any break perceptible to the naked eye. The expression "on board the vehicle" is taken to mean that the camera 10 is present on or in the vehicle, whether this is because it forms a structural part of the vehicle, or because it is placed provisionally on the outer bodywork of the vehicle, or again because it is present in the interior of the vehicle. Thus the camera 10 may, for example, equally well be a mobile phone camera placed on the dashboard and directed towards the outside of the vehicle, or a context camera placed on the bodywork of the vehicle. Such context cameras are, notably, used for displaying the environment of the vehicle, for the purpose of validating the behavior of vehicles provided with driver assistance systems, for example emergency braking assistance systems. Context cameras are also called cameras for validating driver assistance systems. The camera 10 may be any type of monocular camera, including a very wide angle camera of the "fish eye" type. Examples of shots 15 acquired by the camera 10 are shown in FIGS. 4 to 10.

Figure 3:
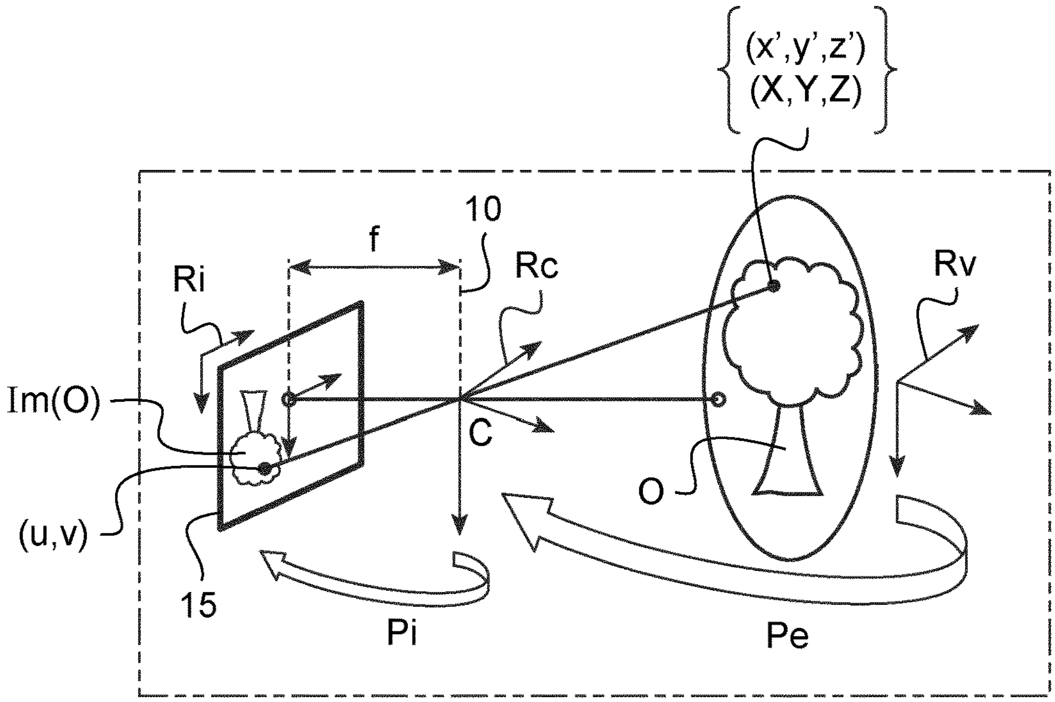
FIG. 3 is a schematic representation of the principle of switching from a reference frame associated with the vehicle to a reference frame associated with a shot.

As explained in the introduction, and as illustrated in FIG. 3, the calibration of the camera 10 makes it possible, on the one hand, to know the actual position of an object O in the environment of the vehicle on the basis of a shot 15 acquired by the camera 10, and, on the other hand, to position, in a shot 15 acquired by the camera 10 or in any other imaginary image, a representation of an object Im(O) detected by the camera 10 or any other sensor in the environment of the vehicle.

As shown in the schematic diagram of FIG. 3, calibrating the camera 10 is therefore a matter of being able to switch from a reference frame Rv associated with the vehicle to a reference frame Ri associated with a shot 15 acquired by the camera.

In order to calibrate the camera 10, it is necessary to determine two types of calibration parameters of the camera: on the one hand, extrinsic parameters Pe for modelling the switch from a point with coordinates (X, Y, Z) in the reference frame Rv associated with the vehicle to a point with coordinates (x', y', z') in a reference frame Rc associated with the camera, and, on the other hand, intrinsic parameters Pi that depend on the nature of the camera 10, for modelling the switch from the point with coordinates (x', y', z') in the reference frame Rc associated with the camera to a point with coordinates (u, v) in the reference frame Ri associated with the shot 15 acquired by the camera 10.

The invention is primarily intended to determine the extrinsic parameters Pe of the camera 10. Here, it is assumed that the intrinsic parameters Pi have been established in advance by a known method. In a variant, it may also be assumed that the intrinsic calibration parameters Pi are unknown and will be determined using the calibration device 1 and the method according to the invention, in addition to said extrinsic parameters Pe.

Remarkably, the camera 10 is calibrated by means of a previously calibrated sensor 20 of the vehicle, referred to below as the "reference sensor 20". Such a reference sensor 20 may be used for detecting at least one object O in the environment of the vehicle, in a given field of view, and for determining its position relative to the vehicle, that is to say its position in a reference frame Rv associated with the vehicle, in other words a reference frame that is fixed relative to the movement of the vehicle. This reference sensor 20 is already calibrated, to the extent that the position of the object O that it determines in the reference frame Rv associated with the vehicle is exact.

For the sake of simplicity, the position of an object O in the reference frame Rv associated with the vehicle is referred to below as the "actual position" of the object O. The actual position of the object O, acquired by the reference sensor 20, is given by the coordinates (X, Y, Z) of a precise point of this object O in the reference frame associated with the vehicle Rv (see FIG. 3). By convention, the precise point giving the position of the object is here taken to be the point at ground level, and therefore at a height of Z=0, and in the center of a straight line joining two limit points of the object O, at this height of Z=0. The X coordinate then gives the lateral distance between the precise point of the object and the origin of the reference frame Rv associated with the vehicle. The Y coordinate, for its part, gives the longitudinal distance between the precise point of the object and the origin of the reference frame Rv associated with the vehicle. Here, the origin of the reference frame Rv associated with the vehicle is taken to be the point located in the middle of the front bumper of the vehicle, at a height equal to ground level, that is to say at a height of Z=0.

The objects that the reference sensor 20 can detect are, for example, of the following kind: motor vehicles such as cars, trucks and buses; pedestrians; or two-wheeled vehicles such as bicycles, scooters or motorcycles.

Here, the reference sensor 20 is mounted on the vehicle, being positioned in the interior for example, at the front rear-view mirror, and orientated towards the front windscreen. In a variant, the reference sensor could be structurally present on the outside of the vehicle, being integrated into the bodywork for example. Thus, regardless of the variant considered, the reference sensor is always on board the vehicle.

The reference sensor 20 is chosen from the following list of sensors: a camera, a stereoscopic camera, a detection system using electromagnetic waves, and a detection system using ultrasonic waves. Detection systems using electromagnetic waves can detect objects by transmitting electromagnetic waves and analyzing the electromagnetic waves reflected by objects. These detection systems are, for example, radar systems using radio waves, or lidar systems using light waves, particularly lasers, for example those having wavelengths in the visible, ultra-violet or infrared ranges. Ultrasonic wave detection systems operate on the same principle as electromagnetic wave detection systems, but by transmitting sound waves. An example of such an ultrasonic wave detection system is sonar.

The reference sensor 20 is assumed to be designed to acquire a plurality of actual positions of at least one object in the environment of the vehicle, where each actual position is acquired in the reference frame Rv associated with the vehicle at a given instant.

Thus, in the course of time, the reference sensor 20 acquires the positions of everything that it detects as an object in its field of view.

In other words, the reference sensor 20 detects, on the one hand, the successive positions over time of the same object present in its field of view, that is to say the positions of the same object at different instants, and, on the other hand, the positions at the same instant of a plurality of distinct objects present in its field of view.

In practice, the reference sensor 20 can detect a plurality of distinct objects at the same instant, provided that said objects are well separated from each other in its field of view. This is because, if the objects are too close together from the viewpoint of the reference sensor 20, it sees them as if they were adjacent to each other and formed an imaginary object, in which case the reference sensor 20 determines a single actual position for this imaginary object instead of two distinct actual positions (one for each object). The detection sensitivity of the reference sensor 20, in other words its capacity to distinguish two objects close together, is considered to be known for the present invention.

It is also preferable for the fields of view of the camera 10 and the reference sensor 20 to coincide, so that they can both see the same object at the same instant, even though the camera 10 and the reference sensor 20 each have a different point of view of this object. Here, the field of view of the camera 10 covers between 20% and 100% of the field of view of the reference sensor 20. Evidently, it is important for the positions of objects acquired by the reference sensor 20 to be located in the part of the field of view of the reference sensor 20 that coincides with the field of view of the camera 10; if this is not the case, then the position cannot be used for the calibration of the camera 10.

Thus each shot 15 acquired by the camera 10 at a given instant comprises at least a partial image of each object whose actual position is acquired by the reference sensor 20 at said given instant.

Ideally, the actual positions detected by the reference sensor 20 extend in a part of the field of view of the reference sensor 20 located between −5 meters and +5 meters laterally relative to the origin of the reference frame Rv associated with the vehicle, and between 3 meters and 30 meters longitudinally relative to this origin, when the sensor has a field of view orientated towards the front of the vehicle, or between −3 meters and −30 meters longitudinally relative to the origin when the reference sensor 20 has a field of view orientated towards the rear of the vehicle.

Additionally, the reference sensor 20 and the camera 10 are synchronized; that is to say, they have the same time origin, so that a shot 15 acquired by the camera 10 at a given instant can be associated with the actual position(s) of objects acquired by the reference sensor 20 at this same given instant. It is acceptable to tolerate a synchronization error that is less than or equal to several tens of milliseconds, for example less than or equal to 30 milliseconds.

The reference sensor 20 is adapted to detect the actual positions of objects regardless of whether the vehicle is stationary or running.

It is assumed here that the acquisition of the shots by the camera 10 and of the actual positions of objects by the reference sensor 20 are executed while the vehicle is running.

To ensure that the actual position of the detected object is as exact as possible, it is important for the conditions of acquisition by the reference sensor 20 to be optimal. In particular, optimal acquisition conditions require the vehicle to be running in a straight line, that is to say on a road with no bends, and on a substantially horizontal and flat roadway, that is to say without any upward or downward slope. Running in a straight line facilitates the precise determination of the coordinates (X, Y) in the reference frame Rv associated with the vehicle. Running on a horizontal roadway ensures that the coordinate Z=0 of the point representing the detected object is maintained. The two conditions are cumulative in this case. For example, running on a section of motorway or a test track that meets these criteria is entirely suitable for the purpose of calibration.

If necessary, these optimal acquisition conditions may be supplemented with a meteorological condition, namely that the vehicle must run with good visibility for the reference sensor 20. For example, if the reference sensor 20 is a camera, it is evidently preferable to perform the acquisition of actual positions in fine weather, rather than in mist. This enhances the precision of the acquisition of the reference sensor 20.

FIGS. 5 to 10 show shots 15 acquired by the camera 10 in optimal acquisition conditions, in a straight line, with a substantially horizontal roadway. It should be noted that, in each of the shots 15 shown in FIGS. 5 to 10, where a plurality of objects (lorries and cars) are present, they are sufficiently well separated from each other to be distinguished in said shot 15 acquired by the camera 10. Here, all the examples shown are situations in which the camera 10 has a field of view orientated towards the front of the vehicle on board which it is located.

Figure 2:
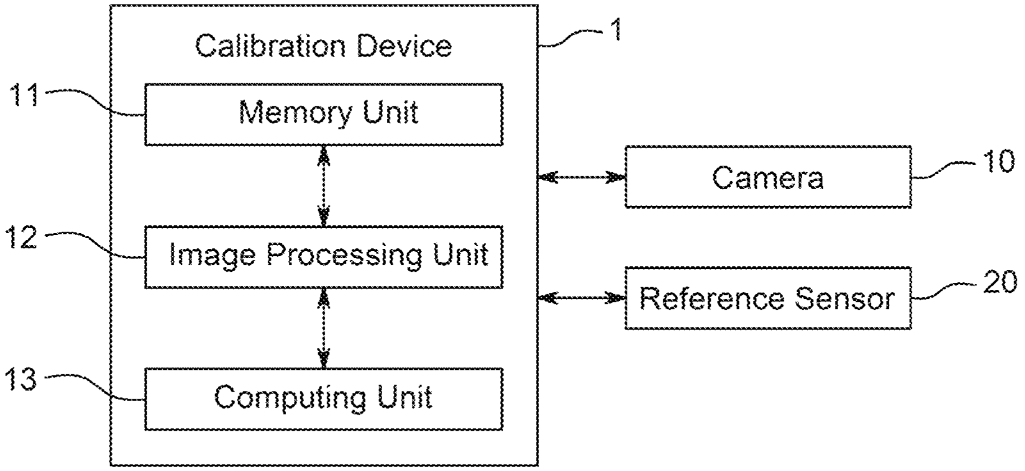
FIG. 2 is a schematic representation of a calibration device according to the invention.

As shown in FIG. 2, the camera 10 and the reference sensor 20 are each adapted to communicate with the calibration device 1.

Notably, the calibration device 1 comprises a memory unit 11, which is adapted to communicate with the camera 10 and the reference sensor 20. More precisely, the camera 10 is adapted to communicate with the memory unit 11 of the device 1, in order to record in this unit each shot 15 acquired and the instant at which this shot was acquired. The reference sensor 20, for its part, is adapted to communicate with the memory unit 11 of the device 1, in order to record in this unit the actual positions that it has detected, and the instant at which it detected each of these actual positions. In addition to this information, the reference sensor 20 can communicate with the memory unit 11, in order to record in this unit the nature of the object whose actual position it has detected. Communication between the memory unit 11 and the camera 10 or the reference sensor 20 takes place by means of a communication bus or via a wireless interface.

As shown in FIG. 2, the calibration device 1 comprises, in addition to the memory unit 11 in which are recorded the actual position of each object in the reference frame Rv associated with the vehicle at a given instant and a shot 15 acquired by the camera 10 at this given instant,

- an image processing unit 12 adapted to process the shots 15 acquired by the camera 10 in order to determine the position, in the reference frame Ri associated with each shot 15, of the images of the objects present in these shots 15, and
- a computing unit 13 adapted to determine the calibration parameters of the camera 10, notably the extrinsic calibration parameters Pe.

The image processing unit 12 and the computing unit 13 are usually remote from the vehicle, whereas the memory unit 11 may be on board the vehicle, or may be partially or completely remote from said vehicle. If the memory unit 11 of the calibration device 1 is partially or completely remote from the vehicle, it is adapted to communicate with the other units 12, 13 of the device 1 via a wireless communication system (also called a wireless interface).

The memory unit 11 may, for example, be a flash memory integrated into the vehicle, or a flash memory connected to the vehicle, using a USB stick for example.

The processing unit 12 and the computing unit 13 may be integrated into a computer, in which case the memory unit 11 may communicate with said processing and computing units 12, 13 by being inserted directly into a USB port of the computer.

The image processing unit 12 may, for example, comprise an image viewing software implemented on a computer and an operator responsible for viewing, selecting and processing the shots 15.

More precisely, the image processing unit 12 communicates with the memory unit 11 to retrieve the shots 15 acquired by the camera 10. The operator of the image processing unit 12 then selects, from among the shots 15 retrieved from the memory unit 11, those that are to be processed. The operator then manually processes each of the selected shots 15, in order to determine which of the images are the images of objects Im(O1), Im(O2), Im(O3) in these shots 15, and what the position of each of these object images is in the reference frame Ri associated with the shot 15.

The selection and processing of the shots for determining the position of the image of each object is described more fully below with reference to the method according to the invention.

Finally, the image processing unit 12 is adapted to form position pairs by matching each position of the image of an object in the reference frame Ri associated with the shot 15 with the actual position of the object in the reference frame Rv associated with the vehicle, at the instant of acquisition of the shot 15.

The image processing unit 12 communicates again with the memory unit 11 to record the position pairs thus formed.

The computing unit 13 then calculates the extrinsic calibration parameters Pe of the camera 10, on the basis of the set of position pairs formed by the image processing unit 12.

The computing unit 13 of the calibration device 1 is therefore also adapted to communicate, on the one hand, with the memory unit 11 to retrieve the position pairs formed by the image processing unit 12, and, on the other hand, with the camera 10 to send it the extrinsic parameters Pe.

In a variant, the computing unit 13 may be designed to communicate only with the memory unit 11, where the extrinsic parameters Pe are then recorded after their calculation. In this case, the memory unit 11 is the only unit adapted to communicate with the camera 10.

The computing unit 13 implements the calculations that are explained more fully below with reference to the method according to the invention described. For this purpose, it comprises a computer adapted to implement optimization calculations.

Figure 1:
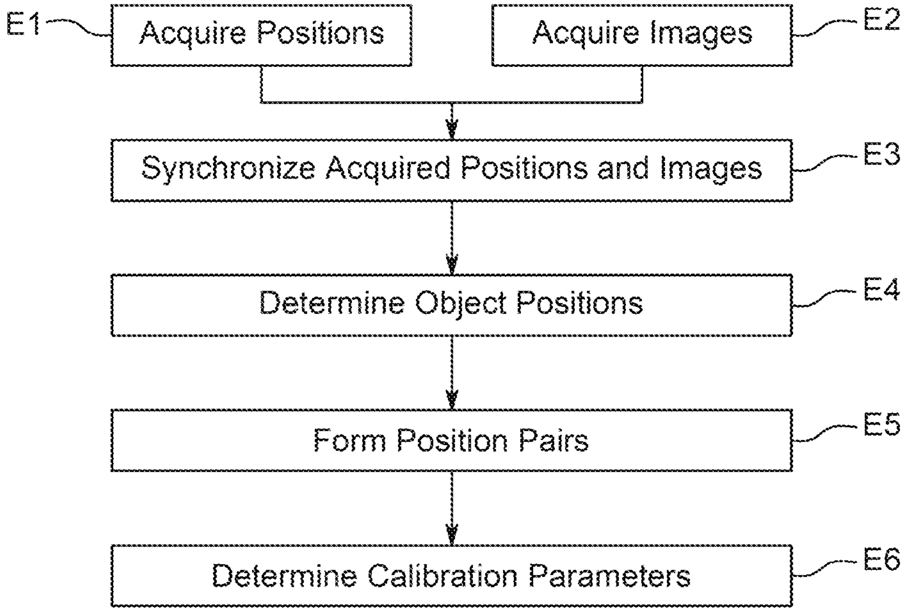
FIG. 1 is a schematic representation of the principal steps of a calibration method according to the invention.

FIG. 1 shows the main steps of the method of calibrating the camera 10 according to the invention.

According to this method, provision is made to determine the calibration parameters of the camera, notably the extrinsic parameters, by means of the following steps:

a) acquiring, by the reference sensor 20, a plurality of actual positions of at least one object in the environment of the vehicle (represented by box E1 in FIG. 1), b) acquiring, using the camera 10, a shot 15 at each instant that one of the actual positions is acquired by the reference sensor 20 (represented by box E2 in FIG. 1), c) determining the position of the image of each object in the shots 15 acquired by the camera (represented by box E4 in FIG. 1), d) forming position pairs by matching each actual position of each object with the position of the image of said object in the shot 15 acquired by the camera 10 at the instant of acquiring said actual position of this object (represented by box E5 in FIG. 1), e) determining, using a computing unit 13, calibration parameters of the camera, from the set of position pairs formed (represented by box E6 in FIG. 1).

Evidently, the calibration device 1 according to the invention is adapted to implement the steps of the method according to the invention.

Steps a) and b) of the method, represented by boxes E1 and E2 in FIG. 1, have already been amply detailed with reference to the description of the device 1.

To ensure that the calibration of the camera 10 is optimal, it is important for the reference sensor 20 to acquire in step a) a plurality of different actual positions in its field of view, that is to say the positions of a plurality of distinct objects. In other words, the coordinates of the precise point representing one of the objects detected by the reference sensor 20 must be different from the coordinates of the precise point representing another of the objects that it detects, in the reference frame Rv associated with the vehicle.

Here, the reference sensor 20 acquires at least 5 different actual positions of objects, distributed over all of the part of the field of view of said reference sensor 20 that coincides with the field of view of the camera 10. The reference sensor 20 acquires, for example, between 5 and 20 different actual positions, preferably 10 different actual positions. The greater the number of different actual positions acquired, the more precise the calibration of the camera 10 will be. Ideally, the actual positions of the detected objects are dispersed in the field of view of the reference sensor 20 which coincides with the field of view of the camera 10. In other words, the actual positions are located in the field of view that is common to the camera 10 and the reference sensor 20, but ideally they are not all concentrated in the same location in this common field of view. Even more preferably, the positions are distributed uniformly in the field of view of the reference sensor 20 which coincides with that of the camera 10.

To enable the reference sensor 20 to acquire enough different actual positions of objects, the running time of the vehicle must be sufficient in step a).

As shown in FIG. 1, an additional step to steps a) and b), represented by box E3, is provided, namely a step of synchronizing the acquisitions of the reference sensor 20 and the camera 10. In this additional step, the memory unit 11 matches the shot 15 taken by the camera 10 at the instant t with all the actual positions of objects acquired by the reference sensor 20 at this instant t. Thus, when the processing unit 12 processes the shots 15 in step c) (represented by box E4), it knows how many images of objects are to be detected in each shot 15 processed: the number of images to be detected is the same as the number of actual positions acquired by the reference sensor 20 at the instant t.

Step c) of the method, represented by box E4 in FIG. 1, is a step of image processing which comprises the selection, where necessary, of the shots 15 to be processed, the detection of the object images in each shot 15 selected, and the detection of the position of each of these object images in the reference frame Ri associated with said shot 15.

This step of image processing is implemented by the operator, assisted by the software implemented in the computer of the image processing unit 12.

More precisely, the image processing unit 12 communicates with the memory unit 11 to retrieve the shots 15 acquired. The operator of the image processing unit 12 then selects, from among the shots 15 retrieved from the memory unit 11, those that are to be processed. The shots 15 selected by the operator for processing are those in which the image of the road is in a straight line and flat, in which the meteorological conditions appear ideal for the reference sensor 20, and in which the object images are well separated from each other. Preferably, these criteria for selection by the operator are cumulative.

Figure 4:
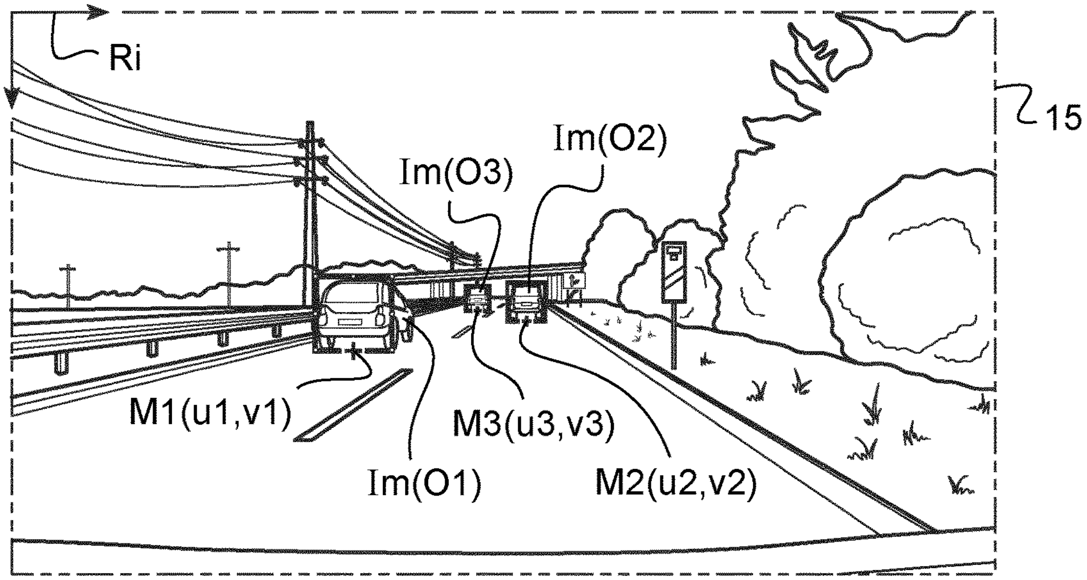
FIG. 4 is a shot taken by the camera, processed to determine the position of the image of an object appearing in said shot.
Figure 5:
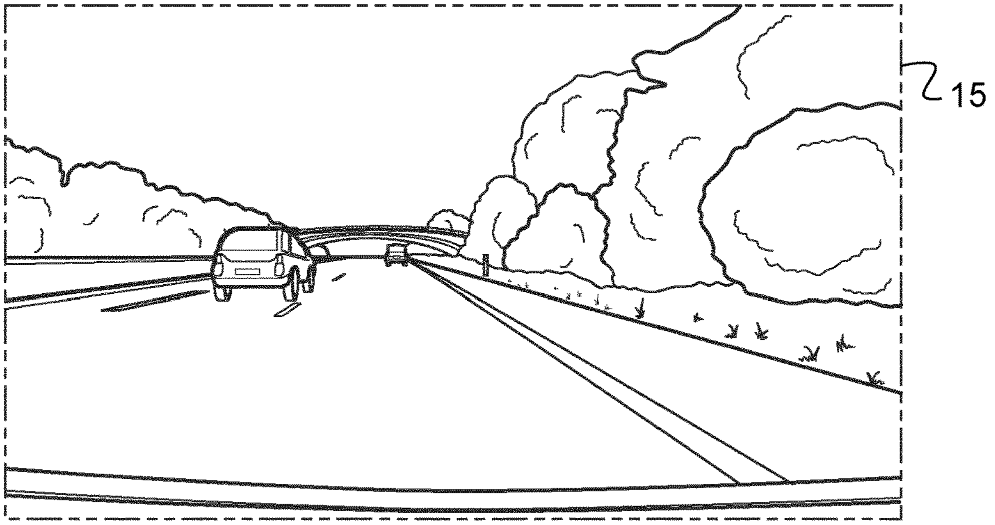
FIG. 5 is a first example of a shot taken by the camera in which the acquisition conditions for the reference sensor are optimal.
Figure 6:
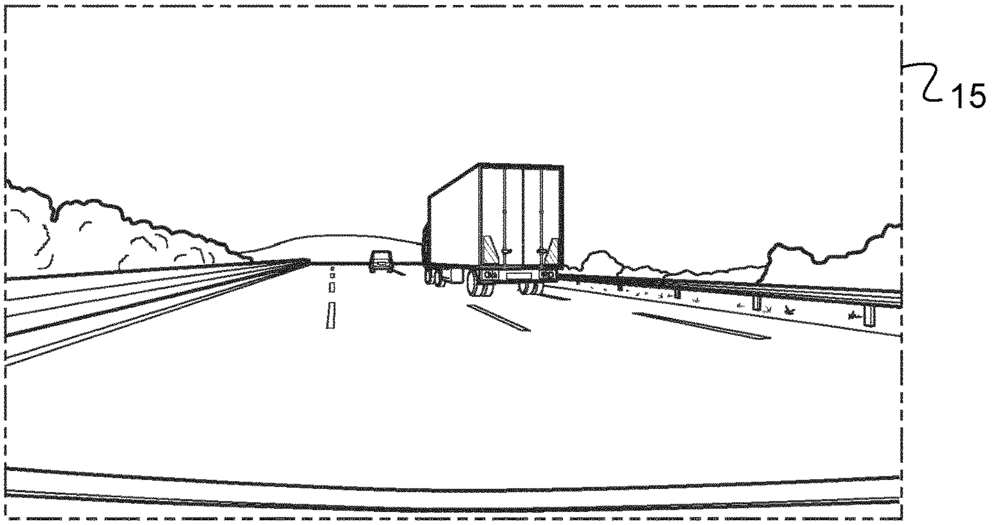
FIG. 6 is a second example of a shot acquired by the camera in which the acquisition conditions for the reference sensor are optimal.
Figure 7:
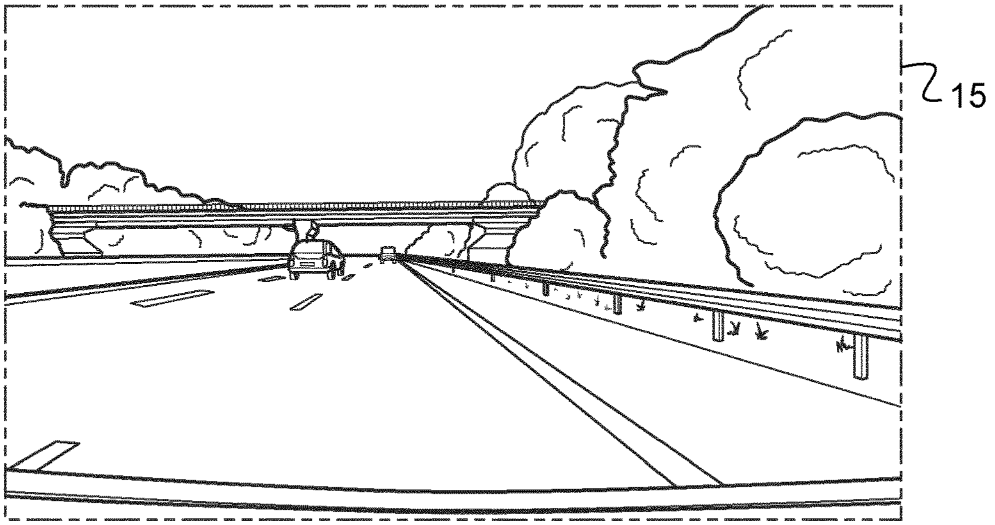
FIG. 7 is a third example of a shot acquired by the camera in which the acquisition conditions for the reference sensor are optimal.
Figure 8:
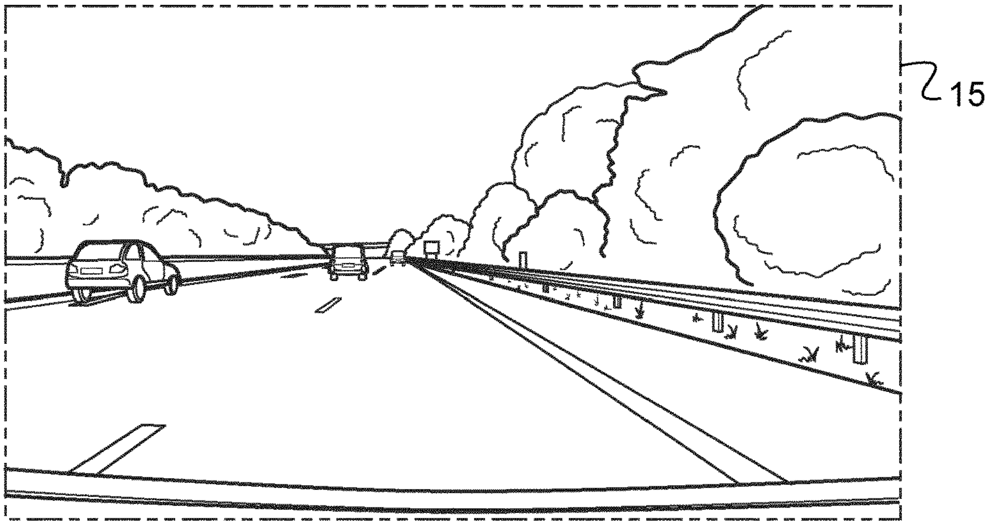
FIG. 8 is a fourth example of a shot acquired by the camera in which the acquisition conditions for the reference sensor are optimal.
Figure 9:
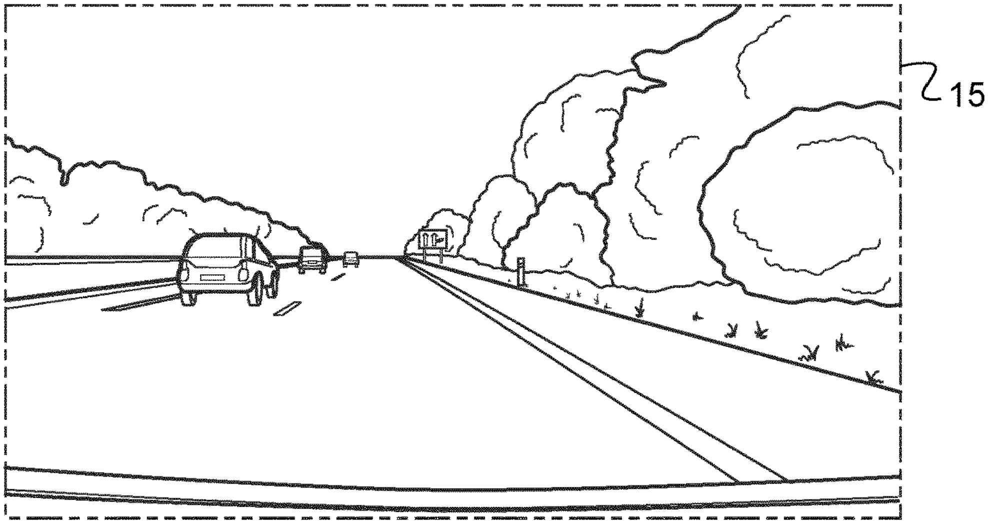
FIG. 9 is a fifth example of a shot acquired by the camera in which the acquisition conditions for the reference sensor are optimal.
Figure 10:
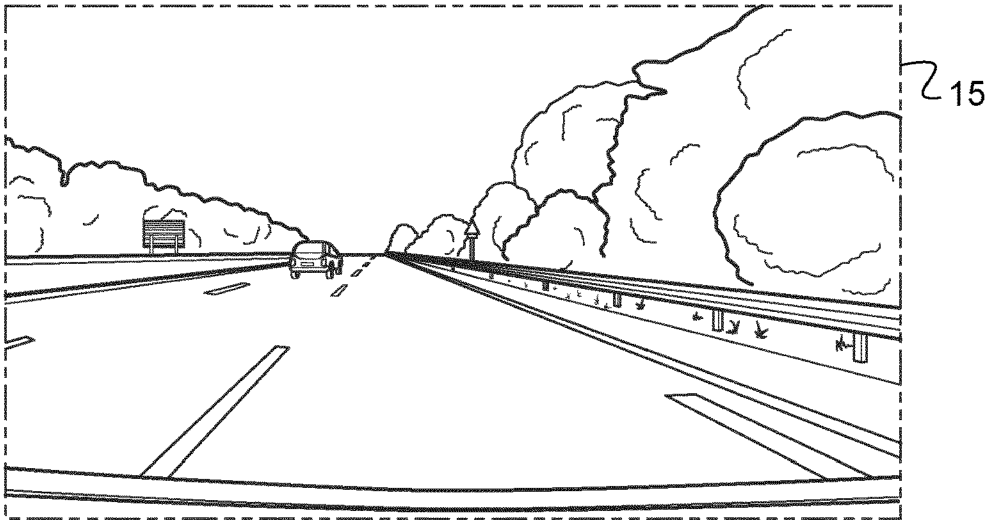
FIG. 10 is a sixth example of a shot acquired by the camera in which the acquisition conditions for the reference sensor are optimal.

As shown in FIG. 4, the operator then manually processes each of the selected shots 15, in order to determine which are the images of objects Im(O1), Im(O2), Im(O3) in these shots 15.

By convention, the image of the object is here assumed to be a geometric shape, for example a square, a rectangle or a trapezium. Here, as shown in FIG. 4, the geometric shape representing the image of the object follows the outline of the rear view of a car. Thus, in order to mark the images of the objects in the shots 15, the operator uses a suitable geometric outline to surround a predetermined area (the rear view, in this case) of the image of each object. In FIG. 4, the operator uses three squares Im(O1), Im(O2), Im(O3), to surround the rear faces of three cars. The VGG Image Annotator® software is, for example, used by the operator to perform this operation of outlining the images of objects with a geometric shape.

In step c), the image processing unit 12 then determines the position of each object image Im(O1), Im(O2), Im(O3) marked in this way in the selected shots 15. For this purpose, the image processing unit 12 determines the coordinates (u1, v1), (u2, v2), (u3, v3) of a precise point M1, M2, M3 of each object image Im(O1), Im(O2), Im(O3) in the reference frame Ri associated with the shot 15. As a general rule, it is the operator who manually determines the precise position of the object image in the shot 15, by identifying the coordinates of a precise point of the geometric shape marking said object image, in the reference frame Ri associated with the shot 15. In a variant, it would be feasible for the position of the image of each object in said shot to be determined automatically by software capable of identifying a precise point in a geometric shape representing the image of the object.

By convention, the precise point giving the position of the image of the object Im(O1), Im(O2), Im(O3) is taken to be the point M1, M2, M3 located at ground level, in the center of a straight line on the ground joining two limit points of the image of the object Im(O1), Im(O2), Im(O3).

For example, in FIG. 4, the precise point M1, M2, M3 giving the position of one of the squares Im(O1), Im(O2), Im(O3) is the center of the side of this square resting on the ground. It is then simply necessary to determine the coordinates (u1, v1), (u2, v2), (u3, v3) of this precise point in the reference frame Ri associated with the processed shot 15. For this purpose, the origin of the reference frame Ri associated with the shot 15 is here taken to be the point located in the upper left-hand corner of the shot 15 (see FIGS. 3 and 4).

Step d) of the method, represented by box E5 de FIG. 1, is a matter of forming position pairs by associating the actual position of an object detected by the reference sensor 20 at an instant t with the position of the image of this object in the reference frame Ri associated with the shot 15 acquired at the same instant t.

For this purpose, the image processing unit 12 matches the position (u1, v1), (u2, v2), (u3, v3) of the image of the object Im(O1), Im(O2), Im(O3) in the reference frame Ri associated with the shot 15 with the actual position (X1, Y1, Z1=0), (X2, Y2, Z2=0), (X3, Y3, Z3=0) of said object O1, O2, O3 in the reference frame Rv associated with the vehicle, at the instant of acquisition of the shot 15.

More precisely, the processing unit 12 retrieves from the memory unit 11 each actual position of an object detected by the reference sensor 20 at the instant of acquisition of the processed shot 15.

When a single object has been detected at this instant by the reference sensor 20, the actual position of the object in the reference frame Rv associated with the vehicle is directly matched with the position of the single object image identified in the shot 15.

When a plurality of objects have been detected by the reference sensor 20 at this instant, the processing unit 12 finds which acquired actual position corresponds to the position of an object image identified in the shot 15. In practice, the operator of the image processing unit 12 recognizes in the shot 15 the nature of the objects photographed, and compares it with the nature of the objects detected by the reference sensor 20, which is recorded in the memory unit 11 with the actual position of each of these objects. In a variant, or when this does not suffice to distinguish the objects in the shots 15, the operator may divide the environment of the vehicle into different areas, for example into lateral areas (areas on the left, on the right, or in front of the vehicle), and/or into longitudinal areas (areas nearby, at a middle distance, or distant from the vehicle). With this divided environment, the operator then finds, on the basis of its actual position, the area in which an object detected by the reference sensor 20 is located, and deduces from this the area of the shot where the image of this object is located, so that the operator can then match the actual position acquired at the instant of acquisition of the shot 15 with the position of the image of this object in the shot 15.

For example, in the shot 15 of FIG. 4, the image processing unit 12 identifies three positions of object images, (u1, v1), (u2, v2), (u3, v3). The image processing unit 12 then retrieves the three actual positions acquired by the reference sensor 20 for these three objects at the instant of acquisition of the shot 15. From the actual positions of these three objects, the operator deduces that one of the objects is located in an area on the left of the vehicle and distant from the vehicle, another is located in an area on the left of the vehicle and near the vehicle, and a third is located in an area in front of the vehicle. The operator then deduces that the image of the object located in the area on the left of the vehicle and near the vehicle is the image Im(O1) at the position (u1, v1); that the image of the object located in the area on the left of the vehicle and distant from the vehicle is the image Im(O3) at the position (u3, v3); and finally that the image of the object located in front of the vehicle is the image Im(O2) at the position (u2, v2).

Step e) of the method, represented by box E6 of FIG. 1, is a calculation step for determining the calibration parameters of the camera 10. Here, it is implemented by the computer of the computing unit 13.

The calibration parameters of the camera 10 include the extrinsic parameters Pe, which are always determined by the method according to the invention, and the intrinsic parameters Pi, which are either known or determined, at least partially, by the method according to the invention.

The extrinsic parameters Pe of the camera 10 are formed by the coefficients of a rotation and/or translation matrix describing the switch from the reference frame Rv associated with the vehicle to a reference frame Rc associated with the camera 10.

This rotation and/or translation matrix, called the matrix of extrinsic parameters Pe, is written in the following general form:

$$Pe = \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \quad \text{[Math. 1]}$$

In this matrix of extrinsic parameters Pe, the coefficients $r_{ij}$ represent the coefficients of rotation between the two reference frames Rv and Rc, while the coefficients $t_k$ represent the coefficients of translation between the two reference frames Rv and Rc.

The intrinsic parameters Pi of the camera 10 comprise, on the one hand, coefficients of distortion related to the lens of the camera 10, particularly coefficients of radial distortion (majority coefficients) and coefficients of tangential distortion (minority coefficients), and, on the other hand, physical coefficients related to the optical center of the lens and to the focal distances of this lens. As a general rule, it is assumed that said physical coefficients can be grouped in the form of a matrix, called the matrix of intrinsic coefficients Pi, written in the following general form:

$$Pi = \begin{bmatrix} f_x & 0 & c_x \\ 0 & f_y & c_y \\ 0 & 0 & 1 \end{bmatrix} \quad \text{[Math. 2]}$$

In this matrix of intrinsic parameters Pi, the coefficients fx, fy are associated with the focal distances of the lens of the camera 10, and the coefficients cx and cy are associated with the optical center of the lens of the camera 10.

If the intrinsic calibration parameters Pi are known, the method according to the invention has the aim of determining the extrinsic parameters only. For this purpose, initially, the coefficients of the matrix of extrinsic parameters are all initialized to a predetermined value. Preferably, if the coefficients of this matrix are unknown, the choice is made to initialize said coefficients to a constant value, equal to 1 for example. Thus, if all the coefficients of the matrix are unknown, the choice is such that $r_{ij}=t_k=1$.

The coefficients of this matrix of extrinsic parameters Pe are then modified progressively by the computing unit 13, using an optimization method.

in step e), the determination of said extrinsic parameters Pe comprises the following substeps:

e1) for each position pair formed in step d), a theoretical position of the image of the object is calculated, based on the actual position of said object and the coefficients of the matrix of extrinsic parameters, and then the difference between the theoretical position thus calculated, on the one hand, and the position of the image of said object in the shot 15, on the other hand, is evaluated;

e2) the mean of all the differences evaluated in step e1) is calculated;

e3) the coefficients of the matrix are modified; and e4) substeps e1) to e3) are iterated until the mean of the differences calculated in substep e2) is minimized.

In substep e1), the theoretical position of the image of an object, given by the coordinates ($u_{th}$, $v_{th}$), is calculated on the basis of the actual position of said object, given by the coordinates (X, Y, Z=0). More precisely, the theoretical position of the image ($u_{th}$, $v_{th}$) is calculated by performing the following sequence of operations:

transformation, using the matrix of extrinsic parameters, of the actual position (X, Y, Z) of the object in the reference frame Rv associated with the vehicle into a position (x', y', z') of this object in the reference frame Rc associated with the camera 10, correction, by means of a known distortion equation using the distortion coefficients described above, of said position (x', y', z') of the object in the reference frame Rc associated with the camera 10 into a corrected position (x", y", z") that allows for the phenomenon of distortion of the lens of the camera 10, and transformation, using the matrix of intrinsic parameters, of the corrected position (x", y", z") of the object in the reference frame Rc associated with the camera 10 into the theoretical position ($u_{th}$, $v_{th}$) of the image in the reference frame associated with the shot 15.

The transformation of the actual position (X, Y, Z) of the object in the reference frame Rv associated with the vehicle into a position (x', y', z') of this object in the reference frame Rc associated with the camera 10 is calculated by means of the following equation:

$$\begin{bmatrix} x' \\ y' \\ z' \end{bmatrix} = \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \qquad \text{[Math. 3]}$$

The correction of the position (x', y', z') of the object in the reference frame Rc associated with the camera 10 into a corrected position (x", y", z") to allow for the phenomenon of distortion of the lens of the camera 10 is calculated by means of the distortion coefficients described above, according to the known distortion equation reproduced below.

$$\begin{cases} x'' = x'\dfrac{1 + k_1 r^2 + k_2 r^4 + k_3 r^6}{1 + k_4 r^2 + k_5 r^4 + k_6 r^6} + 2p_1 x' y' + p_2(r^2 + 2x'^2) \\ y'' = y'\dfrac{1 + k_1 r^2 + k_2 r^4 + k_3 r^6}{1 + k_4 r^2 + k_5 r^4 + k_6 r^6} + p_1(r^2 + 2y'^2) + 2p_2 x' y' \end{cases} \qquad \text{[Math. 4]}$$

In this equation, $k_1$, $k_2$, $k_3$, $k_4$, $k_5$ and $k_6$ are the coefficients of radial distortion, $p_1$ and $p_2$ are the coefficients of tangential distortion, and it is assumed that r satisfies the conditions of the following equation:

$$r^2 = x'^2 + y'^2 \qquad \text{[Math. 5]}$$

It should be noted that, since the actual position (X, Y, Z) of the object is chosen so as to satisfy the condition Z=0, the position (x', y', z') of said object in the reference frame Rc associated with the camera 10 and the corrected position (x", y", z") of this object are also such that z'=z"=0, and consequently the distortion equation for z" is not described here.

The transformation of the corrected position (x", y", z") of the object in the reference frame Rc associated with the camera 10 into the theoretical position ($u_{th}$, $v_{th}$) of the image in the reference frame associated with the shot 15 is calculated according to the following equation.

$$\begin{bmatrix} u_{th} \\ v_{th} \\ 1 \end{bmatrix} = \begin{bmatrix} f_x & 0 & c_x \\ 0 & f_y & c_y \\ 0 & 0 & 1 \end{bmatrix} \begin{bmatrix} x'' \\ y'' \\ z'' \end{bmatrix} \qquad \text{[Math. 6]}$$

In a simplified variant, in which no allowance is made for the phenomenon of lens distortion, that is to say in which the distortion coefficients are all zero, the theoretical position of the image ($u_{th}$, $v_{th}$) is calculated using the following simplified equation:

$$\begin{bmatrix} u_{th} \\ v_{th} \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \qquad \text{[Math. 7]}$$

In this equation, the coefficients fx, fy, cx and cy then represent the only intrinsic calibration parameters Pi of the camera 10 (since it is assumed that there is no distortion). It is assumed here that the coefficients fx, fy, cx and cy are known. When the theoretical position ($u_{th}$, $v_{th}$) is calculated, the coefficients fx, fy, cx and cy are replaced by their known values, and the coefficients $r_{ij}$, $t_k$ of the matrix of extrinsic parameters Pe are taken to be equal to their initial value, for example equal to 1.

Regardless of the variant envisaged for calculating the theoretical position of the image of the object, after said theoretical position ($u_{th}$, $v_{th}$) has been calculated, the computing unit 13 evaluates, in substep e1), the difference between this theoretical position ($u_{th}$, $v_{th}$) and the position (u, v) of the image of said object in the shot 15, determined by the image processing unit 12 in step c). The position (u, v) of the image of the object in the shot 15 is simply that which was matched, in step d), with the actual position (X, Y, Z=0) of the object used for calculating the theoretical position ($u_{th}$, $v_{th}$).

In practice, the difference between these positions is evaluated as the distance "L" between the points whose respective coordinates are ($u_{th}$, $v_{th}$) and (u, v). Thus the difference is found by the following formula:

$$L = \sqrt{(u - u_{th})^2 + (v - v_{th})^2} \qquad \text{[Math. 8]}$$

The computing unit 13 proceeds in this way for all the position pairs established in step d), that is to say for at least 5 position pairs.

In substep e2), the computing unit 13 calculates the arithmetic mean of the differences L thus obtained.

In substep e3), the coefficients $r_{ij}$, $t_k$ of the matrix of extrinsic parameters Pe are progressively modified by an optimization method.

After each modification of the matrix of extrinsic parameters Pe, substeps e1) to e3) are iterated.

In substep E4), the iteration of the substeps e1) to e3) is halted when the mean of the differences L, calculated in substep e2), has been minimized. Thus, when the iteration stops, for each object image, the calculated theoretical position ($u_{th}$, $v_{th}$) approaches as closely as possible the position (u, v) determined in step c) of the method by the image processing unit 12. The coefficients of the matrix of extrinsic parameters Pe that are accepted are therefore those corresponding to the finding of the calculated minimum mean for the differences between the theoretical positions and the positions of the images of the objects determined by the image processing unit 12 in step c).

Here, the optimization method implemented in substeps e1) to e4) is a conventional method, called the gradient descent method.

The present invention is not in any way limited to the embodiments described and represented, and a person skilled in the art will be able to vary it in any way in accordance with the invention. The model of distortion and the model of intrinsic parameters described above are examples of models. They are the most common ones, but there are others such as those used by wide-angle cameras (also called "fish eye" cameras) for distortion. This does not affect the validity of the method.

In practice, it would be possible for the coefficients of translation $t_k$ of the matrix of extrinsic parameters Pe to be known, in which case the known values of these coefficients $t_k$ would be used in the matrix Pe after initialization and throughout the optimization method implemented in substeps e1) to e4). Only the unknown coefficients of rotation $r_{ij}$ are initialized to the value of 1 and then progressively modified in the course of the optimization method of substeps e1) to e4).

As mentioned above, it is also possible for the matrix of intrinsic parameters Pi to be unknown, in which case the coefficients fx, fy, cx and cy of the matrix of intrinsic parameters Pi are determined by the optimization method of substeps e1) to e4). The method proceeds as described above, by initializing the value of the coefficients fx, fy, cx and cy of the matrix of intrinsic parameters Pi to a predetermined level, then modifying these coefficients in the same way as the coefficients $r_{ij}$, $t_k$ of the matrix of extrinsic parameters Pe, until the mean of the differences between the theoretical position and the determined position of each object image, in each shot 15, is as small as possible. In practice, the predetermined initial values of the coefficients fx, fy, cx, cy of the matrix of intrinsic parameters Pi will not be made equal to 1, as is the case for the coefficients of the matrix of extrinsic parameters Pe, but will be made equal to more realistic values. Thus, assuming for example that the image of the optical center of the camera 10 is usually near the middle of the shot 15, the coefficients cx and cy can be initialized by making them equal to the coordinates of the central point of the shot 15. The coefficients fx and fy, for their part, can be initialized by taking the mean values of the focal distances stated by the manufacturer of the camera 10.

The greater the number of unknown coefficients to be determined using the device 1 and/or the method according to the invention, the greater must be the number of position pairs formed in steps a) to d) of the method.

On the other hand, in order to avoid the step of selecting the shots by means of the image processing unit 12, it is feasible to choose the environment in which the vehicle is running for the acquisition of the actual positions and the shots 15. This ensures that the reference sensor 20 acquires the actual position of a single object at each instant, so that the shot acquired by the camera at the same instant comprises a single object image.

In practice, the vehicle on board which the reference sensor 20 and the camera 10 are mounted can be made to run in a straight line, at a predetermined speed, on a flat road free of any objects except for the single object that is to be detected, for example a car. This object moves around said vehicle to position itself in specific locations in the field of view of the reference sensor 20, at chosen instants. The object car may, for example, be driven by a driver who knows at which locations it must be positioned at precise instants in the course of time.

The image processing unit 12 retrieves the shots 15 recorded in the memory unit 11 at said precise instants at which the driver of the object has positioned said object at the desired actual position.

The image processing unit 12 then directly forms position pairs by associating the actual position of the object at the instant t with the position of the image of this object in the shot 15 taken at this instant t.

The rest of the method is unchanged.

On the other hand, it is feasible for the device 1 and the method according to the invention to be fully automated; in other words, it would be possible to dispense with the operator of the image processing unit 12.

In this case, the image processing unit 12 is automated. In addition to the computer, it then comprises a processor capable of analyzing images automatically, such as a neural network, notably a convolutional neural network. The YOLO® neural network is an example of a network that can be used for this purpose. In this case, the processing unit 12 automatically detects the images of the objects Im(O1), Im(O2), Im(O3) in the shots 15 acquired by the camera, and associates them with a geometric shape (usually a square, rectangle or trapezium). The neural network is trained to recognize said geometric shapes on the basis of images of reference objects such as images of cars, trucks or pedestrians. The image processing unit 12 then determines the coordinates (u1, v1), (u2, v2), (u3, v3) of the precise point giving the position of said geometric shapes representing the images of objects Im(O1), Im(O2), Im(O3) in the reference frame Ri associated with the shot 15. The precise point is, for example, chosen here as the middle of the side of the geometric shape resting on the ground.

To facilitate the detection of the object images by the automated image processing unit, it is preferable for the acquisition of the actual positions and of the shots 15 to be implemented in the same type of environment as that described above, enabling the step of selecting the shots 15 to be dispensed with. The rest of the device 1 and the rest of the method are unchanged.

The invention claimed is:

1. A method for calibrating a camera on board a motor vehicle using a reference sensor on board said vehicle, wherein provision is made for determining calibration parameters of the camera, the method comprising:

a) acquiring, by the reference sensor, a plurality of actual positions of at least one object in an environment of the vehicle, b) acquiring, using the camera, a shot at each instant when one of the actual positions is acquired by the reference sensor, c) determining a position of an image of each object in the shots acquired by the camera, d) forming position pairs by matching each of the actual positions of each object with the position of the image of said object in the shot acquired by the camera at the instant of acquiring said actual position of the object, and e) determining, using a computing unit, calibration parameters of the camera, from a set of the position pairs formed, wherein, in step e), said calibration parameters of the camera are extrinsic parameters formed by a coefficients of a rotation and/or translation matrix describing a switch from a reference frame associated with the vehicle to a reference frame associated with the camera, and wherein, in step e), the determining said extrinsic calibration parameters comprises the following substeps:

e1) for each of the position pairs formed, a theoretical position of the image of the object is calculated, based on the actual position of said object determined in step a) and on the coefficients of the matrix, and then a difference between the theoretical position calculated and the position determined in step c) of the image of said object in the shot is evaluated;

e2) the mean of all the differences evaluated in step e1) is calculated;

e3) the coefficients of the matrix are modified; and e4) substeps e1) to e3) are iterated until the mean of the differences calculated in substep e2) is minimized.

2. The method as claimed in claim 1, wherein, before substep e1), the coefficients of the rotation and/or translation matrix are all initialized to a predetermined level.

3. The method as claimed in claim 2, wherein the predetermined level is equal to 1.

4. The method as claimed in claim 1, wherein the acquisition steps a) and b) are executed while the vehicle is running along a straight line and on a horizontal and flat roadway.

5. The method as claimed in claim 1, wherein, in step a), the reference sensor acquires at least 5 different actual positions of objects, dispersed in a whole of a field of view of said reference sensor covering a field of view of the camera.

6. The method as claimed in claim 1, wherein step c) of determining the position of the image of each object in each shot acquired by the camera is executed manually by an operator.

7. The method as claimed in claim 1, wherein step c) of determining the position of the image of each object in each shot acquired by the camera is executed by an image processing unit comprising a neural network.

8. A device for calibrating a camera on board a motor vehicle, configured to communicate with said camera and with a reference sensor on board the vehicle, said reference sensor being provided to acquire a plurality of actual positions of at least one object in an environment of the vehicle, said device comprising:

a memory unit configured to record the actual position of each object in a reference frame associated with the vehicle at a given instant and a shot acquired by the camera at the given instant, an image processing unit configured to determine a position of an image of each object in the shots acquired by the camera, and to form position pairs by matching said position of the image of the object in the shot with the actual position of said object at the instant of acquisition of the shot, and a computing unit configured to calculate calibration parameters of the camera based on a set of the position pairs formed by the image processing unit, wherein said calibration parameters of the camera are extrinsic parameters formed by a coefficients of a rotation and/or translation matrix describing a switch from a reference frame associated with the vehicle to a reference frame associated with the camera, and wherein said computing is configured to calculate said extrinsic calibration parameters as follows:

1) calculate for each of the position pairs formed, a theoretical position of the image of the object, based on the actual position of said object determined by the memory unit and on the coefficients of the matrix, and then evaluate a difference between the theoretical position calculated and the position determined by the image processing unit of the image of said object in the shot;

2) calculate the mean of all the differences evaluated in 1);

3) modify the coefficients of the matrix; and 4) iterate 1) to 3) until the mean of the differences calculated in 2) is minimized.

9. The device as claimed in claim 8, wherein the reference sensor is chosen from the following list of sensors: a camera, a stereoscopic camera, a detection system using electromagnetic waves, and a detection system using ultrasonic waves.

10. The device as claimed in claim 9, wherein the detection system using electromagnetic waves is a radar or lidar system.

11. A method for calibrating a camera on board a motor vehicle using a reference sensor on board said vehicle, wherein provision is made for determining calibration parameters of the camera, the method comprising:

a) acquiring, by the reference sensor, a plurality of actual positions of at least one object in an environment of the vehicle, b) acquiring, using the camera, a shot at each instant when one of the actual positions is acquired by the reference sensor, c) determining a position of an image of each object in the shots acquired by the camera, d) forming position pairs by matching each of the actual positions of each object with the position of the image of said object in the shot acquired by the camera at the instant of acquiring said actual position of the object, and e) determining, using a computing unit, calibration parameters of the camera, from a set of the position pairs formed, wherein, in step a), the reference sensor acquires at least 5 different actual positions of objects, dispersed in a whole of a field of view of said reference sensor covering a field of view of the camera.

12. A method for calibrating a camera on board a motor vehicle using a reference sensor on board said vehicle, wherein provision is made for determining calibration parameters of the camera, the method comprising:

a) acquiring, by the reference sensor, a plurality of actual positions of at least one object in an environment of the vehicle, b) acquiring, using the camera, a shot at each instant when one of the actual positions is acquired by the reference sensor, c) determining a position of an image of each object in the shots acquired by the camera, d) forming position pairs by matching each of the actual positions of each object with the position of the image of said object in the shot acquired by the camera at the instant of acquiring said actual position of the object, and e) determining, using a computing unit, calibration parameters of the camera, from a set of the position pairs formed, wherein step c) of determining the position of the image of each object in each shot acquired by the camera is executed manually by an operator.

* * * * *